Patented June 7, 1949

2,472,152

UNITED STATES PATENT OFFICE 2,472,152

DIESEL ENGINE FUEL

Adalbert Farkas and Arthur F. Stribley, Jr., Long Beach, Calif., assignors to Union Oil Company of California, Los Angeles, Calif., a corporation of California No Drawing. Application August 5, 1944, Serial No. 548,310

12 Claims. (Cl. 44—57)

This invention relates to Diesel engine fuels, to methods of treating such fuels to improve their ignition qualities, to addition agents which have the effect of improving the ignition qualities of Diesel engine fuels and to methods of treating such fuels to increase substantially the improvement in ignition qualities obtained by the addition of said addition agents. More particularly, this invention relates to the improvement in the ignition qualities of untreated or pretreated Diesel engine fuels obtained by the addition to said fuels of ignition accelerators and particularly the addition of organic peroxides and/or hydroperoxides and to methods of producing said peroxides. This application is a continuation-in-part of application, Serial No. 522,840, filed February 17, 1944, now Patent No. 2,430,865, dated November 18, 1947.

Diesel engines or other engines of the auto-ignition type require fuels having high cetane numbers. Cetane number is related to the interval between the instant of fuel injection and the instant of ignition of the fuel in the combustion chamber of an engine (the shorter the interval the greater the cetane number) and is described and the method of test defined on page 172 of the 1943 issue of the A. S. T. M. Standards on Petroleum Products and Lubricants prepared by the A. S. T M. Committee D-2 on Petroleum Products and Lubricants. Ordinary high quality Diesel fuel has a cetane number of 40–47 and it is desirable in many instances to increase this value to 50–55 or even higher. It is known that by means of special refining processes, such as extraction of ordinary distilled fuel with large quantities of liquid sulfur dioxide, heavy treatment with concentrated sulfuric acid, and the like, it is possible to increase the cetane number of the fuel. However, such treatments are usually costly and wasteful of fuel due to the relatively high treating losses for a given increase in cetane number.

It is an object of our invention to prepare a high quality, high cetane number Diesel engine fuel by adding organic peroxides and/or organic hydroperoxides thereto.

It is another object of our invention to prepare a high quality, high cetane number Diesel engine fuel by pretreating said Diesel fuel in such a manner that subsequent addition of an organic peroxide and/or hydroperoxide increases the cetane number of said fuel to a greater extent than said peroxide and/or hydroperoxide would increase the cetane number of said untreated fuel.

It is also an object of our invention to provide a Diesel engine fuel to which may be added an organic peroxide and in which said organic peroxide does not readily decompose.

It is a particular object of our invention to produce a high quality, highly stable, high cetane number Diesel engine fuel by pretreating said fuel to improve the cetane value and the peroxide susceptibility of said fuel and subsequently adding to said pretreated fuel small quantities of organic peroxides and/or hydroperoxides.

It is a more specific object of our invention to prepare a high quality, highly stable, high cetane number Diesel engine fuel by pretreating said fuel to improve the cetane value and the peroxide susceptibility of said fuel and subsequently adding to said pretreated fuel a peroxide or peroxide concentrate obtained by the controlled partial oxidation of a naphthene hydrocarbon or a napthenic fraction of petroleum.

Other objects, features and advantages will be apparent from the following description of our invention.

Our invention resides in adding to Diesel engine fuels organic peroxides and/or hydroperoxides or concentrates containing appreciable proportions of peroxides and/or hydroperoxides which have the effect of increasing the cetane number of such fuels. The term peroxides will be used hereinafter to include organic peroxides, hydroperoxides and mixtures thereof. The invention further resides in adding peroxides to a Diesel engine fuel which has been pretreated by one of the treating processes described hereinbelow which processes cause not only an initial increase in the cetane number of the fuel but more importantly they render the fuel more susceptible to cetane number improvement on the addition of said peroxides. This latter characteristic will be referred to as peroxide susceptibility regardless of what agent is added to improve cetane number. Thus a fuel having a high peroxide susceptibility will show a greater increase in cetane number upon the addition of a given quantity of peroxide or other agent having ignition accelerating characteristics than will a fuel having a low peroxide susceptibility.

A further effect of pretreatment, as described herein, is to produce a Diesel engine fuel in which peroxides are appreciably more stable than they are in the corresponding untreated fuel.

We have found that certain organic peroxides which we may produce by the controlled partial oxidation of naphthene hydrocarbons or fractions of petroleum containing naphthene hydrocarbons may be added to Diesel engine fuels in amounts equivalent to between about 0.1% to about 3.0% or even as much as 5.0% by weight of the fuel to produce high cetane number fuels. The addition of about 1% of peroxide, which is a preferred amount, has been found to increase the cetane number of a raw or untreated Diesel fuel about 5–10 points depending upon the character of the fuel. We have found also that the addition of 1% of peroxide to a Diesel engine fuel which has been pretreated as described herein increases the cetane number between 7 and about 17 points depending upon the particular fuel and pretreatment employed. The pretreatment itself increases the cetane number about 2–5 points so that the total increase resulting from pretreatment and addition of about 1% of peroxide amounts to 9–22 points in cetane number or about twice the increase obtained by the direct addition of peroxide to a raw fuel.

Furthermore, we have found that when we add peroxide to a raw fuel the peroxide content of the fuel, as indicated by analysis decreases relatively rapidly and generally about 50% of the added peroxide will decompose in about two days. The cetane number of the fuel does not decrease in like manner, in fact, it has been found to show only a relatively slight decrease after periods of storage of one or two months. On the other hand, the peroxide content of pretreated fuels to which peroxides have been added shows only a relatively slight decrease on storage and in this case the change in cetane number is negligible.

The improvement in peroxide susceptibility of Diesel engine fuel and the increased peroxide stability in such fuel resulting from pretreatment is believed to be due to the removal of certain ignition delaying compounds, which may be represented by X, or to the conversion of these compounds into compounds which do not have ignition delaying characteristics. Thus, if the pretreatment is a selective solvent extraction or acid treatment X is removed and if the pretreatment comprises partial oxidation X may be converted into XO which represents oxygenated or oxidized X compounds which may have no effect on the ignition characteristics of the fuel in some instances or which may even improve the ignition characteristics, depending on the character of X as shown hereinafter.

According to our theory, peroxides react readily with X to produce XO, thus accounting for the fact that peroxides decomposed readily in untreated fuel whereas in treated fuels they do not decompose as rapidly. Moreover, the greater peroxide susceptibility of pretreated fuels is explained by the fact that in the case of untreated fuels peroxide oxygen reacts with X to produce XO and XO does not have as great an ability to reduce ignition delay as do the peroxides themselves.

The compounds which we refer to as X include compounds such as alkyl sulfides and possibly other sulfur compounds, such as mercaptans if present although these are not believed to be the only types or classes of compounds included in the group considered herein as X. We have found that mercaptans do delay ignition and therefore tend to reduce the cetane number of Diesel fuel. Moreover, they inhibit oxidation, they cause the decomposition of peroxides present in a fuel and they are readily oxidized to disulfides or other compounds of the XO type which in this case may be ignition accelerators. The disulfides are not easily oxidized further.

Alkyl sulfides are similar in their effect on cetane number to the mercaptans but their effect is not as pronounced. These compounds oxidize readily to sulfoxides and/or sulfones, which latter compounds fall in the XO class and are believed to improve ignition characteristics of a Diesel fuel.

While we believe that the above theory accounts in part at least for the effect of pretreatment of Diesel fuel in improving peroxide stability and peroxide susceptibility we do not wish to be bound thereby.

For the pretreatment of a Diesel engine fuel to increase the cetane number, to increase the peroxide susceptibility and to increase the stability of peroxides subsequently added to said fuel we desire to employ any of the following described methods:

Adsorption processes have been found to be particularly effective methods of pretreating Diesel fuel. Thus a Diesel fuel may be percolated through a bed of granular adsorbent at ordinary temperatures or at elevated temperatures, such as those up to about 300° F. or higher, and obtain a treated Diesel fuel having the desired characteristics. Adsorbents which may be employed include silica gel, such as one of the ordinary commercial silica gels used as an adsorbent, as well as fuller's earth, bauxite, any of the various commercial clays, alumina, activated carbon and the like. The loss of fuel in such treatments varies with the severity of the treatment, i. e., with the contact time, efficiency of the adsorbent, etc., but may vary from about 5% to about 10% of the stock treated.

Selective solvent extraction processes are also satisfactory methods of pretreating Diesel engine fuel. The type of solvent employed is one having solvency for the hydrocarbons having low hydrogen to carbon ratios and thus corresponds to the solvents normally employed in solvent refining lubricating oil distillates. Treatment with a selective solvent is carried out under conditions such that generally between about 5% and about 15% of the raw Diesel fuel is dissolved by the solvent. Solvents of this type which have been found to be particularly desirable include liquid $SO_2$, low molecular weight aliphatic alcohols, such as methanol and ethanol, and the like. Extraction with methanol, for example, carried out with 2 parts of the solvent to 1 part of Diesel fuel at 75° F. removes about 13% by volume of the fuel as extract and the raffinate from this extraction has the characteristics desired in a pretreated fuel. Extraction with 1.25 volumes of liquid $SO_2$ per volume of fuel at 18° F. also removes about 20% by volume of the fuel and again the raffinate has the desired characteristics.

Treatment with mineral acid, such as concentrated sulfuric, phosphoric acid, or the like, is also a particularly satisfactory method of pretreatment. Thus treatment with about 20 pounds of concentrated sulfuric acid per barrel of fuel removes approximately 4% by volume of the fuel and produces the desired effect of increasing the peroxide susceptibility and raising the cetane number of the fuel.

Another type of pretreatment which has been found to produce satisfactory results is treatment with inorganic salts, such as aluminum chloride, aluminum bromide, zinc chloride, ferric chloride, magnesium chloride and the like, as well as various mercury salts, such as the nitrate, sulfate and chloride. These salts are normally employed in a substantially anhydrous condition and may be mixed with the fuel and allowed to settle or the fuel may be percolated or passed through a bed of these salts which in this instance are preferably adsorbed on a carrier.

Still another method of pretreating consists in partially oxidizing the fuel under controlled conditions so as to oxidize the ignition inhibiting compounds referred to hereinabove as X. Such oxidative pretreatment may be effected with oxygen or air or other oxygen-containing gas with or without the use of oxidation catalysts. It may also be effected by means of oxidizing agents, such as aqueous solutions of hypochlorites or other salts of oxyhalogen acids or the oxy-acids themselves, potassium permanganate, potassium dichromate, nitric acid oxides of nitrogen chlorine, chlorine oxides, bromine, and the like. An effective pretreatment may be carried out by injecting small quantities of oxygen into a liquid Diesel fuel and passing the oxygenated fuel over a catalyst consisting of copper chloride deposited on granular fuller's earth.

Peroxides which we prefer to use as ignition accelerators in producing our high quality Diesel engine fuel include those organic peroxides which may be produced by the controlled partial oxidation of hydrocarbons or hydrocarbon fractions. The peroxides produced by said partial oxidation may be separated from the oxidates and added to a Diesel engine fuel in the form of substantially pure peroxides or as peroxide concentrates or in those instances in which appreciable proportions of peroxides are formed during the oxidation, the oxidate, itself, may be added to a Diesel engine fuel or included in a Diesel fuel composition.

While any and all organic peroxides are valuable in improving cetane number of Diesel engine fuel, it is desirable that the peroxide have a boiling point or boiling point range not appreciably lower than the initial boiling point of the fuel to which it is added. We prefer to use for this purpose peroxides of the hydroperoxide type formed by the oxidation of saturated cyclic hydrocarbons which are generally classified as naphthene hydrocarbons. These hydroperoxides are formed readily by contacting naphthene hydrocarbons with an oxygen-containing gas, for example, air, oxygen, or air enriched with oxygen, in the liquid phase. The peroxides which are produced have the formula R.OOH, where R is a naphthene ring containing four to eight carbon atoms in the ring with or without one or more organic substituents attached to the ring or where R is a saturated condensed ring grouping with or without one or more organic substituents attached to the condensed ring nucleus. The organic substituents may be alkyl, cycloalkyl, aralkyl, or aryl radicals or combinations of these radicals. These hydroperoxides are particularly effective in increasing the cetane number of untreated or pretreated Diesel engine fuels.

Specific hydrocarbons which we may oxidize by our process include cyclopropane, cyclobutane, cyclopentane, cyclohexane, cycloheptane, cyclooctaine, and the various mono-, di-, tri-, and poly substituted saturated cyclic hydrocarobons in which the substituent groups may be methyl, ethyl, propyl, isopropyl, butyl, isobutyl, tertiary butyl, etc., alkyl radicals, for example, methylcyclopentane, dimethylcyclopentanes, ethylcyclopentane, diethylcyclopentanes, trimethylcyclopentanes, etc., and the various isomers of these substituted cyclopentanes and similar substituted cyclohexanes, cycloheptanes, etc. The substituents may also be cycloalkyl, aralkyl, aryl or combinations of two or more of these radicals or one or more alkyl radicals with one or more of these radicals. Thus compounds, such as cyclopentylcyclohexane, benzylcyclopentane, phenylcyclohexane, etc., may be employed. We may also use as oxidation feed condenser ring naphthenes, such as bicyclo (0,1,4)-heptane, bicyclo-(0,2,4,)-octane, bicyclo-(1,2,3)-heptane, bicyclo-(1,1,3)-heptane, bicyclo-(0,1,3)-hexane, bicyclo-(0,2,2,)-hexane, indane, decahydronaphthalene, dodecahydrofluorene, tetradecahydroanthracene, tetradecahydrophenanthrene, decahydroacenaphthene and the various substituted condensed ring naphthenes in which the substituent groups may be alkyl, aralkyl, cycloalkyl, aryl or combinations of two or more of these groups.

While we may use any and all of the naphthene hydrocarbons as indicated hereinabove, we prefer to use those naphthene hydrocarbons having at least one substituent group since we have found for example that the alkyl substituted cyclobutanes, pentanes, hexanes, heptanes and octanes all oxidize more readily and yield peroxides in relatively greater proportions than do the corresponding unsubstituted naphthenes, i. e., the cyclobutane, cyclopentane, etc. The ease with which the substituted saturated cyclic hydrocarbons oxidize to produce hydroperoxides indicates that the presence of a tertiary hydrogen atom facilitates peroxide formation and it is believed that the peroxide group, i. e., the —OOH— group replaces a tertiary hydrogen more readily than it does a secondary hydrogen and that in the case of methylcyclopentane, for example, the hydroperoxide group probably enters the ring at the carbon to which the methyl group is attached. The desired reaction which we obtain by our method of oxidation does not alter the chemical structure of the hydrocarbon, i. e., ring cleavage does not occur so that the carbon skeleton of the hydroperoxide is the same as the carbon skeleton of the naphthene hydrocarbon from which the peroxide is produced.

In addition to the individual naphthene hydrocarbons indicated above, we may use as the oxidation feed mixtures of two or more naphthene hydrocarbons or we may use hydrocarbon fractions containing naphthenes. Thus fractions of straight-run gasolines containing appreciable proportions of naphthene hydrocarbons respond to our oxidation treatment to yield relatively large proportions of peroxides. Fractions of straight-run gasoline containing in the order of about 35% or more of naphthene hydrocarbons which may or may not contain aromatic hydrocarbons, the remaining constituents being paraffinic hydrocarbons, are very desirable oxidation feeds. Although the presence of aromatic hydrocarbons in the oxidation feed is not seriously objectionable, we prefer to employ fractions containing less than about 10% by volume of aromatic hydrocarbons. Again, although the oxidation feed may contain even large proportions of olefinic hydrocarbons we may prefer in certain instances to use a feed containing less than about 5% olefins and in some cases probably less than about 2% of olefins.

In those instances in which we desire to separate peroxides produced by partial oxidation from the oxidate before incorporating such peroxides in a Diesel engine fuel we prefer to oxidize hydrocarbon fractions having a relatively narrow boiling point range such as in the order of 50° F. or less since the products from the oxidation of narrow boiling fractions are more readily resolved into substantially pure peroxide compounds. However, relatively wide boiling range fractions have been oxidized and peroxide concentrates produced without difficulty by methods described hereinbelow. Moreover, such wide boiling range fractions may be oxidized, the oxidate treated to remove acidic constituents and the acid-free product used as the peroxide additive in the preparation of Diesel engine fuel. Thus hydrocarbon fractions, such as gasoline, kerosene or Diesel fuel fraction of petroleum have been successfully oxidized for the production of peroxides.

Peroxides which we may produce by our process in good yields and in substantially pure form include cyclopentyl hydroperoxide, methylcyclopentyl hydroperoxide, the isomeric dimethylcyclopentyl hydroperoxides, ethylcyclopentyl hydroperoxide, the isomeric diethylcyclopentyl hydroperoxides, the isomeric methylethylcyclopentyl hydroperoxides, cyclohexyl hydroperoxide, methylcyclohexyl hydroperoxide, the dimethylcyclohexyl hydroperoxides, ethylcyclohexyl hydroperoxide, the three isomeric diethylcyclohexyl hydroperoxides, the isomeric methylethylcyclohexyl hydroperoxides, 1-4 methylisopropylcyclohexyl hydroperoxide, as well as the corresponding derivatives of cyclobutane, cycloheptane, etc., and the higher molecular weight substituted cycloparaffins.

The method of carrying out the oxidation to produce saturated cyclic hydrocarbon hydroperoxides comprises heating the naphthene hydrocarbon to an elevated temperature such as about 250° F. to about 275° F. and blowing air or other gas containing free oxygen into the heated hydrocarbon until the peroxide content of the charge reaches the desired value. When this point has been reached the charge is removed from the oxidation vessel and treated for the recovery of peroxide as described hereinbelow. While we may operate at any temperature high enough to cause the hydrocarbon molecule to combine with oxygen, such as above about 150° F. we have found that temperatures in the order of 200° F. to 325° F. or preferably between about 240° F. and 300° F., are particularly desirable. We may oxidize at ordinary atmospheric pressure or at super-atmospheric pressures, such as up to about 500 pounds per square inch gage, however, we prefer to operate at pressures in the order of between about 50 and 150 pounds per square inch gage. The pressure employed in any given case will depend upon the particular hydrocarbon or hydrocarbon fraction being oxidized, upon its boiling point and upon its ease of oxidation for, as is known, other factors remaining constant, the higher the pressure the more rapid will be the oxidation. When oxidizing the lower molecular weight naphthene hydrocarbons, such as methylcyclopentane, it is particularly desirable to operate under superatmospheric pressure in order to prevent volatilization of the hydrocarbon. The rate of air-blowing may be varied widely and will depend upon the utilization of oxygen present in the air or oxygen containing gas. Thus sufficient air or other oxidizing gas should be supplied to effect the oxidation in a reasonable period of time. It is preferable that the air be distributed or dispersed in fine bubbles in the liquid hydrocarbon since the efficiency of oxygen utilization depends to a great extent upon the degree of dispersion of the air in the liquid. In those cases in which the oxidation is carried out under superatmospheric pressure the exit gases from the oxidation vessel may be enriched with additional quantities of fresh air or oxygen and recycled to the oxidation vessel and in this manner the percentage of oxygen in the oxidizing gas may be maintained at a relatively high value without seriously reducing the efficiency of the process from the point of view of compressing large quantities of air, the oxygen content of which is not efficiently utilized in each cycle.

The proportion of peroxide in the oxidized product may be varied depending upon the conditions and the time of oxidation and we may produce hydrocarbon mixtures containing up to about 20% by weight of peroxides or even higher. Thus we may produce a material containing from about 1% to about 20% by weight of peroxide although the percentage will depend upon the particular stock being oxidized since there appears to be a variation with different hydrocarbon feeds in the relative rates of production of peroxides on the one hand and other partial oxidation products on the other.

In those cases in which the peroxides are removed from the oxidate as a peroxide concentrate or as a substantially pure peroxide the residue or the mixture of hydrocarbon and partially oxidized hydrocarbon remaining after the removal of peroxide may be further oxidized to produce more peroxide. It may be treated alone or after mixing it with additional quantities of new feed, such as enough new feed to make up the volume losses incurred during the oxidation and recovery processes. This residue is particularly good oxidation feed because it contains some peroxides which, as pointed out hereinbelow, are oxidation accelerators and/or initiators.

The type of oxidation process referred to above is a batch operation and while this method is highly satisfactory for the production of our peroxides, it is less efficient than a continuous type of operation which may be effected by oxidizing a naphthene hydrocarbon or hydrocarbon fraction containing naphthene hydrocarbons until the peroxide content has reached the desired value, at which time portions of the oxidized hydrocarbon are continuously withdrawn from the oxidation vessel, treated for the removal of peroxides, and returned to the oxidation vessel together with sufficient new or unoxidized hydrocarbon feed to maintain an approximately constant liquid level in the oxidation vessel. In this type of operation peroxides are always present in the charge being oxidized and the rate of peroxide formation is readily maintained at a high level.

Although we may effect the oxidation without the use of oxidation initiators, accelerators, catalysts, etc., we prefer to use a peroxide, such as a peroxide produced in the operation as an initiator or accelerator, as indicated hereinabove for subsequent operations. Thus in a batch oxidation or in starting a continuous oxidation process the addition of small amounts of naphthene peroxides to the naphthene hydrocarbon to be oxidized materially increases the rate of peroxide formation in the new charge. As described hereinbelow the removal of peroxides from the oxidate by the various extraction and chemical processes is not complete. Depending upon the method employed, the treated oxidate will contain from a few tenths of one per cent to 2% or even 3% of peroxides, more complete removal being uneconomical in any given case.

In addition to the use of naphthene peroxides as initiators or accelerators we may also use for this purpose metallic catalysts, such as oil-soluble metal salts, i. e., naphthenates of iron or manganese or the like, and also metal salts of inorganic acids, such as copper chloride or copper sulfate.

As mentioned hereinabove, we prefer to operate under conditions such that the formation of peroxides takes place with the minimum production of other partial oxidation products and particularly with the minimum production of acidic oxidation products since it is known that these acidic products catalyze the decomposition of peroxides. Thus it is found that in oxidizing, for example, a gasoline fraction rich in dimethylcyclopentane, the percentage of peroxides in the partially oxidized mixture reaches a maximum of about 10% to as high as about 20% by weight and if the oxidation is continued for a longer period of time the percentage of peroxides is found to decrease. Concurrently the percentage of acids increases slowly until the peroxide content has reached a maximum and then increases far more rapidly. There is, therefore, in any given case, a limit to which the oxidation can be economically carried out when peroxides are the desired product. This limit, it should be pointed out, depends upon the particular hydrocarbon or hydrocarbon mixture being oxidized and also upon the conditions under which the oxidation is effected.

Generally we prefer to effect the oxidation in the presence of a basically reacting agent which will form salts with acids which are produced during the oxidation thus effectively removing said acids which, as indicated hereinabove, appear to be catalysts for the decomposition of peroxides. Thus by operating in the presence of such an agent we may increase the extent to which oxidation may be carried, i. e., increase the peroxide content without effecting objectionable decomposition or further oxidation of the peroxides. Agents which may be used for this purpose include basic compounds of the alkali and alkaline earth metals, i. e., sodium, potassium, lithium, calcium, magnesium, strontium and barium, as well as the alkaline earth metals per se and particularly magnesium. The most desirable basic compounds include the alkali metal carbonates and bicarbonates and the oxides, hydroxides and carbonates of the alkaline earth metals. These metals or compounds may be placed within the oxidation vessel below the level of the hydrocarbon liquid in such a manner that they will be contacted by the liquid. The compounds or metals may be used in powdered form in which case they are dispersed in the liquid being oxidized. Moreover, those basic compounds which are appreciably water soluble, particularly sodium carbonate or bicarbonate, potassium carbonate or bicarbonate, and the like, may be used in the form of an aqueous solution, said solution being injected into the oxidation vessel with the air stream or at the top of the vessel and allowed to fall by gravity through the hydrocarbon liquid contained in the vessel in a continuous manner.

Instead of effecting neutralization of acids within the oxidation chamber we may prefer in some instances to withdraw portions of the partially oxidized mixture and treat it in a separate vessel with one of the above named basic compounds, returning the deacidified oxidate to the oxidation chamber for further treatment. Thus we may continuously remove a stream of material from the oxidation chamber and pass it over a bed of one of the solid basic compounds in granular or lump form such as particles of about 10 mesh or larger, and return the acid-free oxidate continuously to the oxidation chamber. Also the acids may be removed from the oxidate by extracting it with an aqueous solution of a basic compound such as sodium bicarbonate.

It has been found that by removing acidic oxidation products in the manner described above during the period of oxidation the rate of peroxide formation is increased and that the proportion of peroxides in the finished oxidate may be carried to an appreciably higher value without objectionable decomposition occurring.

The separation of a peroxide concentrate or of substantially pure peroxides from an oxidate comprising peroxide, unoxidized hydrocarbon and other partial oxidation products of the hydrocarbon may be effected by fractional distillation, by solvent extraction, by combinations of extraction and distillation or by chemical means, such as by treatment with an alkali, or alkaline earth metal hydroxide or carbonate or other basic compound, in which case the salt of the peroxide may be formed and separated from the hydrocarbon mixture.

Fractional distillation processes may be employed to separate peroxides from other compounds present in the oxidate because the hydroperoxides boil at temperatures at least about 175° F. above the boiling point of the hydrocarbons from which they are produced. The decomposition of the peroxides during the distillation can be minimized by reducing the distillation temperature as by carrying out the distillation under reduced pressure and/or in the presence of steam, and by reducing the heating time.

Other methods for the concentration and recovery of peroxides are solvent extraction or processes involving chemical reaction which processes can be carried out at relatively low temperatures and if further purification is desired the concentrates may be distilled with steam under vacuum and under such conditions as to reduce the time of heating necessary to complete the distillation operation. In any case when distillation processes are to be employed it is desirable that the acids present in the oxidate be removed prior to distillation for, as indicated hereinabove, these acids catalyze the decomposition of hydroperoxides and their catalytic effect increases as the temperature increases.

In separating a peroxide concentrate containing in the order of about 35% or more of peroxides from the oxidized hydrocarbon we may extract the hydrocarbon with, for example, 82% aqueous methyl alcohol, separating the aqueous alcohol phase from the hydrocarbon phase and subsequently diluting the alcohol phase with water to reject an oily layer comprising a major proportion of peroxides and minor proportions of other partial oxidation products and hydrocarbon. Instead of diluting the aqueous alcoholic phase with water, this phase may be distilled preferably under reduced pressures to vaporize the alcohol and water leaving the peroxides, other oxidation products and hydrocarbon as a bottoms fraction. In this case the bottoms fraction will be a peroxide concentrate containing about 35% by weight of peroxides. This bottoms fraction may be further fractionally distilled as, for example, at a pressure of 0.1 m.m. of mercury whereby a richer concentrate comprising peroxides is obtained.

Solvents which may be used in place of aqueous methyl alcohol for concentrating peroxides by extraction of the partial oxidation product include oxygenated organic compounds alone or in combination with various proportions of water. It is preferred that the solvent be water soluble. Compounds of this type include the aliphatic alcohols, such as ethyl, propyl, isopropyl, butyl, isobutyl, etc., the dihydroxy alcohols, such as ethylene glycol, 1,2-propanediol, 1,3-propanediol, 1,2-butanediol, 1,3-butanediol, 1,4-butanediol, 2,3-butanediol; polyhydroxy alcohols, such as glycerol; ethers and esters of di- and polyhydroxy alcohols, such as ethyleneglycol monophenylether, ethyleneglycol monobenzylether, diethyleneglycol monomethylether, glycol diacetate; diketones and ketoacid esters, such as acetylacetone, methylacetylacetate, etc.; amines such as diethylamine, trimethylamine, butylamine, aniline, diethylenetriamine, pyridine, morpholine; amides such as acetamide, formamide, diethylacidamide, etc.; amino alcohols, such as ethanolamine, diethylaminoethanol, ethylethanolamine, 2-amino-2-methylpropanol, etc.

In employing the above described solvents, extraction conditions and particularly the temperatures of extraction are maintained such that the peroxides will be preferentially dissolved and the unoxidized hydrocarbons will be insoluble in the solvent or preferentially rejected by the solvent. The selection of extraction conditions will depend upon the particular solvent to be employed as will be apparent to those skilled in the art.

In a chemical method for concentrating the peroxides produced by partial oxidation of a naphthene hydrocarbon an oxidate containing about 15% by weight of peroxide is treated with aqueous sodium hydroxide containing up to about 50% by weight of NaOH at temperatures preferably in the order of atmospheric temperature or below. After thorough mixing, the treated product is allowed to settle and separate into a hydrocarbon phase and an aqueous phase which latter phase may contain a solid precipitate of the sodium salt of the peroxide, depending upon the concentration of sodium hydroxide employed. The aqueous phase is diluted with water and acidified with a mineral acid such as dilute sulfuric acid or dilute hydrochloric acid to convert the sodium salt into the hydroperoxide. The reformed hydroperoxide separates from the acidified aqueous phase as an oily layer along with other partial oxidation products and hydrocarbon. This peroxide concentrate may be fractionally distilled under vacuum to separate the peroxide in substantially pure form.

Although aqueous solutions of sodium hydroxide containing between about 5% and about 50% NaOH may be successfully employed to form the sodium salts of the hydroperoxide, we prefer to use concentrations between about 30% and about 45% by weight of NaOH for with these concentrations substantially all of the hydroperoxide which is converted into its sodium salt is insoluble in the hydrocarbon phase and only slightly soluble in the aqueous phase resulting from the extraction. The sodium peroxide salt may then be filtered or otherwise separated from the liquid materials in relatively pure form and subsequently dissolved in water and acidified with a dilute mineral acid, such as sulfuric acid, to convert the sodium salt into the hydroperoxide. The resulting hydroperoxide is relatively insoluble in the aqueous phase and forms a supernatant oily layer which may be separated from the aqueous layer by decantation. This product may be further purified if desired by fractional distillation. Peroxide concentrates produced by extraction with 30% to 45% aqueous NaOH, as just described, usually contain in the order of 75% by weight or more of hydroperoxides before distillation and may contain as high as 99+% by weight of hydroperoxide after careful fractional distillation under vacuum.

In addition to sodium hydroxide we may use other relatively strongly basic compounds of sodium, lithium, potassium, calcium, barium, strontium and magnesium to convert the hydroperoxide into its salt. Thus we may use sodium carbonate, potassium hydroxide or carbonate, lithium hydroxide or carbonate, or the hydroxides or hydrated oxides of calcium, magnesium, barium and strontium. These compounds are preferably used in the form of an aqueous solution.

A further and particularly efficient method of extracting peroxides, particularly the hydroperoxides from hydrocarbon oxidates, consists in extraction with alcoholic alkalies. The proportion of alcohol may be as high as about 75%. Thus a mixture comprising 75% by weight of methanol, 12.5% by weight of sodium hydroxide and 12.5% by weight of water has been found to be particularly efficient. Also a solvent comprising 25% by weight of methanol, 22% by weight of sodium hydroxide and 53% by weight of water is very effective in extracting peroxides from hydrocarbon oxidates containing peroxides. The effect of the alcohol appears to be to cause the equilibrium of the reaction of the base with peroxide to form the peroxide salt in the direction of the peroxide salt, thus increasing the efficiency of extraction over those extractions effected with aqueous alkalies. Although only methanol and sodium hydroxide were mentioned, other alcohols and other basic compounds, as above disclosed, may be employed in this extraction process.

A particularly desirable method of producing a peroxide concentrate which may contain as high as about 65% or even 75% of peroxides comprises oxidizing a hydrocarbon fraction of petroleum, such as one boiling in the range of about 190° F. to 210° F. at a pressure of about 130 pounds gage and a temperature of about 280° F. in a continuous manner. An oxidation vessel fitted with an inlet for oxidation feed at a point near the top of the vessel, an outlet at the top of the vessel for spent air or other oxidizing gas, an outlet at the bottom of the vessel for oxidized product and an inlet near the bottom of the vessel for oxidizing gas. By means of a spider or other form of nozzle the air is blown into the charge in such a manner that it is finely dispersed in the hydrocarbon liquid. The hydrocarbon feed is mixed with about one-half its volume or less of a 5% sodium bicarbonate solution and the mixture is pumped continuously into the oxidation vessel. At the same time air is blown into the unit in a continuous manner causing agitation of the charge as well as furnishing oxygen to effect the desired oxidation. The liquid oxidate and partially spent sodium carbonate solution is withdrawn continuously from the bottom of the unit and passed directly to a settling chamber where phase separation occurs. The aqueous phase is withdrawn from the bottom of the settler and the oxidate or upper phase is passed continuously to a fractionating column where unoxidized hydrocarbon is vaporized and the peroxides together with other oxygen-containing, non-acidic oxidation products are obtained as bottoms. The vaporized hydrocarbon material may be returned to the oxidizer as a part of the feed to that unit. The oxidate leaving the separator is substantially acid free and by using steam to aid the distillation in the fractionator very little peroxide decomposition occurs during the distillation. The peroxide concentrate obtained as bottoms from the fractionator is relatively stable and is an excellent ignition accelerator when added to untreated or pretreated Diesel engine fuels in amounts indicated herein.

The peroxide concentrate from the fractionator may be further treated as by fractional distillation to increase the proportion of peroxides in said concentrate. Such a distillation is preferably carried out at reduced pressures using steam in order to effect the distillation at moderately low temperatures and thus reduce the decomposition losses. The overhead from this distillation consists primarily of ketones, alcohols and other partial oxidation products. The bottoms contain substantially all of the peroxides originally present separated from a part of the ketones, alcohols, etc.

In those instances in which it is desired to produce peroxide concentrates containing high proportions of peroxides, such as 75% and higher, by distillation of a hydrocarbon oxidate, as indicated above, it is preferable to discontinue the oxidation when the oxidate contains 7% or 8% or less of peroxide. If the peroxide content is allowed to increase above about 8% the proportion of other partial oxidation products increases rapidly so that the ratio of peroxides to other partial oxidation products, such as ketones, alcohols, etc., decreases and since distillation of the oxidate separates substantially all the oxidation products from unoxidized hydrocarbon the proportion of peroxide in the distillation bottoms or concentrate decreases as the peroxide content of the oxidate increases above the point indicated above.

Other uses of the peroxides of this invention are as catalytic agents in one phase or two phase polymerization processes, such as in the polymerization of butadiene and styrene in the production of synthetic rubbers, as a drying accelerator in oils, paints, varnishes, etc., as an accelerator in curing synthetic resins, as an accelerator in the vulcanization of certain synthetic rubbers, as a bleaching agent, etc. These peroxides may be used as oxidation agents and also as oxidation initiators, accelerators, or catalysts since they are found to aid in the oxidation of hydrocarbons, particularly those hydrocarbons which do not oxidize readily in the absence of catalytic agents.

The use of peroxides as drying accelerators in oils, paints, varnishes and the like, appear to have particular merit. Thus in preparing a boiled linseed oil, or in bodying drying oils in general, the desired thickening of the oil can be obtained with shorter heating periods, and/or at lower temperatures if small proportions in the order of from about 0.5% to about 5% by weight or more of the peroxide is added to the oil during the heating period. Moreover, the boiled oil is generally lighter in color indicating a bleaching action of the peroxide. In order to show the effect of small proportions of peroxide a sample of raw linseed oil having a viscosity of 58 centipoises at 25° C. was heated for two hours at 550° F. The product had a viscosity of 107 centipoises at 25° C. With the same heat treatment a sample of the oil to which had been added 0.6% by weight of dimethylcyclopentyl hydroperoxide attained a viscosity of 118 centipoises and a sample to which was added 2.4% by weight of the same peroxide attained a viscosity of 165 centipoises at 25° C. The oils in which peroxide was used were much paler in color than the oil cooked without peroxide. Moreover, there was no noticeable difference in the drying behavior of the three products when spread in thin films and exposed to the atmosphere.

In order to show the effect of lower heating temperatures, raw linseed oil alone and linseed oil containing 3% by weight of the above named peroxide were heated to a maximum temperature of 300° F. The viscosity of the oil without peroxide remained unchanged after nine hours of treatment, however, this sample showed some darkening. The oil containing peroxide increased from a viscosity of 58 centipoises to 86 centipoises at 25° C. in four and one-half hours and subsequently showed no further change in viscosity during the period of treatment. This latter product was far lighter in color than even the raw linseed oil.

In using peroxides as an aid to the preparation of boiled drying oils or the heavier stand oils the peroxide may be used alone or it may be used in conjunction with one of the usual metallic driers and the boiling effected in the usual manner. Alternatively, the initial boiling may be effected in the presence of a metallic drier at the usual temperatures of about 550° F. and the treatment may then be finished by reducing the temperature and adding peroxide. The final thickening may thus be accomplished at temperatures of about 300° F. in the presence of peroxide. In all instances oils treated with peroxide are found to possess lighter colors than those treated under corresponding conditions with or without metallic catalysts or driers in the absence of peroxides.

The peroxides are active in not only increasing the rate of thickening or drying of drying oils but also in increasing the rate of drying of paints and varnishes containing drying oils. Thus the time required for a film of paint or varnish to set or to form a nontacky film is reduced by incorporating peroxides in the paint or varnish before it is applied to a surface. Peroxides may be used in conjunction with, and in addition to, the usual amounts of metallic driers in the preparation of faster drying paints and varnishes or in some instances it may be advantageous to replace a part or all of the metallic drier with peroxide. One of the advantages gained by replacement of the drier with peroxide is that metallic driers remain active in the paint film, tending on long exposure to produce highly oxidized films which may become very hard and brittle. On the other hand the effectiveness of the peroxide is lost after relatively short periods of exposure and paint films dried with peroxide rather than the usual driers do not become brittle as rapidly as those formed with metallic driers present.

In using the peroxides as Diesel fuel additives, as oxidation agents, as catalytic agents, or as initiators or accelerators, as indicated hereinabove, we may use the substantially pure peroxide separated by any of the methods described herein, we may use peroxide concentrates or we may use the oxidates directly without concentrating the peroxides therein. In some instances we may desire to prepare the substantially pure peroxides and subsequently dilute the peroxides by dissolving them in a solvent such as a hydrocarbon fraction different from the hydrocarbon or hydrocarbon fraction from which the peroxides were originally produced, in a chlorinated hydrocarbon solvent, in an oxidized or other oxygen-containing hydrocarbon solvent, in an aromatic solvent such as benzene, toluene, etc., or other solvent depending upon the intended use of the peroxides. Thus when the peroxides are to be used as Diesel engine fuel additives they may be first dissolved in a portion of the Diesel engine fuel to give a peroxide concentrate which may later be dissolved in additional quantities of the same or like Diesel engine fuel to produce a finished high grade fuel. Or, where the peroxides are to be used as oxidation accelerators the susbtantially pure peroxide may be dissolved in a portion of the hydrocarbon or other compound which is to be oxidized to form a peroxide concentrate and this concentrate may then be dissolved in further quantites of said compound to produce the oxidation stock.

It is well-known that peroxides catalyze gum formation in gasolines and, in fact, Diesel engine fuels to which peroxides have been added often show an increased gum content, as indicated by deposition of gum or resinous materials on exposure to air at elevated temperatures. However, it has been found that extremely small proportions of certain compounds added to Diesel engine fuels containing peroxide reduce the gum forming tendencies of these fuels. In general the compounds which are active in preventing gum formation in the Diesel engine fuels containing peroxides are the various gum inhibitors employed to reduce or prevent gum formation in gasolines or gasoline fractions. Compounds which may be employed include the aliphatic or carboxylic compunds containing one or more hydroxyl groups, such as phenols, cresols, mixtures of cresols, which are commercially available under the name of cresylic acids, pyrogallol, catechol, resorcinol and the naphthols; compounds containing one or more amino groups such as aniline, p-phenylenediamine; compounds containing one or more hydroxyl and one or more amino groups, such as ethanolamine, p-aminophenol, benzyl - p - aminophenol; secondary amines, such as diethanolamine, diaminodiphenylamine, and like compounds. In general compounds containing more than one hydroxyl or amino group or compounds containing both hydroxyl and amino groups are particularly desirable gum inhibitors. These gum inhibitors may be employed in quantities ranging from about 0.005% to about 0.1% or even as high as about 0.3% by weight without affecting the peroxide susceptibility or the cetane value of a Diesel engine fuel to which peroxide is to be added or to a fuel containing a peroxide.

It should be pointed out that not all Diesel engine fuels are gum forming even in the presence of peroxides because the gums are probably formed from unsaturated, i. e., olefinic or diolefinic hydrocarbons contained in a Diesel fuel. For this reason artificial fuels prepared with paraffinic and naphthenic hydrocarbons alone may be treated with peroxides without appreciably increasing their gum forming tendencies. The usual petroleum distillates employed as Diesel engine fuels on exposure to air at elevated temperatures usually produce gums in the presence of added peroxides, however the gum forming tendency is reduced by pretreatment and in some cases substantially eliminated. However, pretreated fuels containing peroxides may be moderately gum forming in some instances, and for these reasons it may be preferable to include small proportions of a gum inhibitor in the peroxide-containing fuel.

While we prefer to use naphthene peroxides for improving the cetane value of Diesel engine fuels particularly where the latter have been pretreated, we may employ other organic peroxides as additives for increasing the cetane number of Diesel engine fuels where the latter have been pretreated in accordance with the aforesaid described methods. Such other organic peroxides will include those which may be produced by the oxidation of other classes of hydrocarbons, such as paraffins, olefins and aromatics which peroxides may be referred to as paraffin peroxides, olefin peroxides and aromatic peroxides, respectively, or mixtures of two or more types of hydrocarbon peroxides, such as may be produced by oxidation of hydrocarbon fractions containing more than one class of hydrocarbons. Other organic peroxides which contain substituent groups other than hydrocarbon groups and which may be desirably employed include acetone peroxide, benzoyl peroxide and like peroxides. It is essential that the peroxide be soluble in Diesel engine fuel in the proportions employed. Moreover, the peroxide should be relatively stable and it should have a boiling point preferably within the boiling point range of the Diesel fuel or at least not substantially lower than the initial boiling point of the fuel and not more than 25° F. to about 50° F. above the maximum boiling point of said fuel.

The following examples will serve to illustrate further our invention but are not to be taken as in any way limiting the broader aspects of our invention.

*Example I*

A 2,000 ml. portion of a dimethylcyclopentane-paraffin mixture, boiling between about 194° F. and 198° F., containing about 65% by volume of dimethylcyclopentane and having a gravity of 61.7° A. P. I. was placed in a pressure vessel, heated to 265° F. and blown with air at a rate of 5 cubic feet per hour for a period of three hours. A pressure of 100 pounds per square inch gage was maintained in the oxidation vessel during the period of air blowing. Analysis of the oxidate indicated the presence of 6.6% by weight of peroxides and an acid number of 10.7 mg. of KOH/ml. The oxidized dimethylcyclopentane fraction was cooled to atmospheric temperature and removed from the oxidation unit.

A portion of the oxidate was treated for the recovery of peroxides in the following manner: A 100 ml. portion was extracted twice with 15 ml. portions of 18% aqueous sodium hydroxide at a temperature of 41° F. The extracts were combined, diluted with 100 ml. of water and neutralized with 75 ml. of 10% sulfuric acid. An oily layer separated from the diluted and acidified aqueous layer and this oily layer was found to have a peroxide content, calculated as dimethylcyclopentyl hydroperoxide, of 62% by weight.

*Example II*

A 19 gallon portion of a dimethylcyclopentane-rich gasoline fraction containing 65% by volume of dimethylcyclopentanes and having a boiling range of 194° F. to 198° F. to which was added a small amount of a peroxide concentrate so that the resulting blend had a peroxide content of 0.19% by weight was oxidized at a pressure of 85 to 90 pounds per square inch gage and a temperature of 270° F. to 275° F. using an air rate of 500 cubic feet per hour for a period of 1.67 hours. The oxidation was discontinued at this time and the product was cooled and withdrawn from the oxidation vessel. This oxidate had a peroxide content, calculated as dimethylcyclopentyl peroxide, of 4.2% by weight and an acid number of 2.5 mg. KOH/ml.

To 17.5 gallons of oxidate containing 4.2% by weight or 2,000 grams of peroxide was added one gallon of 40% by weight NaOH and the mixture thoroughly agitated at about 70° F. After standing approximately one hour to allow phase separation, 10 gallons of hydrocarbon layer was decanted. This layer contained 0.6% by weight or 170 grams of peroxides. The aqueous phase consisting of a mixture of solid precipitate and an emulsion of hydrocarbon oil and water was diluted with 2 gallons of water and thoroughly agitated. On standing an additional 5 gallons of hydrocarbon oil was separated which contained 2% by weight or 281 grams of peroxides. The aqueous layer comprising a solution of the sodium salt of the hydroperoxide in water was acidified with 3 gallons of 10% sulfuric acid. After thorough mixing the acidified product was allowed to stand and 800 grams of an oily layer containing 81% by weight or 648 grams of peroxides was obtained.

Example III

A 2,000 ml. portion of dimethylcyclopentane-paraffin mixture boiling between about 194° F. and 198° F. and having a gravity of 61.7° A. P. I. to which had been added 3% by weight of dimethylcyclopentyl hydroperoxide was oxidized for a period of 4.5 hours at 240° F. and 100 pounds per square inch pressure using an air rate of 5 cubic feet per hour. The oxidate contained 10% by weight of peroxide and had an acid number of 10.0 mg. KOH/ml. A portion of the oxidate was treated with 38% NaOH solution and the resulting precipitate of the sodium salt of dimethylcyclopentyl hydroperoxide was separated by filtration. This salt was dissolved in water and acidified with 10% sulfuric acid. The dimethylcyclopentyl hydroperoxide, which separated as an oily layer, was distilled at a pressure of 0.1 m. m. mercury to produce a substantially pure compound having the formula $(CH_3)_2C_5H_7.OOH$.

Example IV

A 1,500 ml. portion of substantially pure methylcyclohexane having a gravity of 51.8° A. P. I. was oxidized for a period of six hours at a temperature of 275° F. and a pressure of 100 pounds per square inch gage using an air rate of 5 cubic feet per hour. The product contained 8.7% by weight of peroxides calculated as methylcyclohexyl hydroperoxide and had an acid number of 4.2 mg. KOH/ml.

The oxidate was treated with 38% NaOH. The sodium salt of the hydroperoxide filtered from the liquid mixture, dissolved in water and acidified with dilute sulfuric acid. The oily layer which separated from the acidified aqueous solution was distilled under a pressure of 0.1 m. m. of mercury to produce a substantially pure methylcyclohexyl hydroperoxide having the formula $CH_3.C_6H_{10}.OOH$.

Example V

A 1293 ml. portion of technical methylcyclopentane (approximately 95% purity) having a gravity of 57.1° A. P. I. was oxidized for a period of four hours at a temperature of 260° F. and a pressure of 100 pounds per square inch gage using an air rate of 5 cubic feet per hour. The oxidate contained 6.7% by weight of methylcyclopentyl hydroperoxide and had an acid number of 6.7 mg. KOH/ml.

A substantially pure hydroperoxide having the formula $CH_3.C_5H_9.OOH$ was separated from this oxidate in a manner similar to that employed in Examples III and IV.

Example VI

A fraction of petroleum boiling between about 200° F. and about 260° F. and consisting of about 62% naphthenes, 28% paraffins and 10% aromatics was oxidized in a continuous manner in the presence of a 5% sodium bicarbonate solution, the bicarbonate solution being mixed with the feed to the oxidizer, by blowing with air at a temperature of about 275° F. and a pressure of about 130 pounds gage. When the peroxide content of the oxidate reached a value of 8% by weight oxidate was withdrawn from the bottom of the oxidation vessel together with partially spent bicarbonate solution at such a rate as to maintain a constant liquid level in the oxidizer. The withdrawn material was passed to a separator where the partially spent bicarbonate solution was allowed to settle and the clear, water-free oxidate was pumped from the separator into a fractionating column maintained at such a temperature that the overhead or top column temperature was between about 190° F. and about 200° F. and steam was introduced into the bottom of the column at such a rate that substantially all of the unoxidized hydrocarbons present in the oxidate were vaporized at the above named temperature and passed as overhead from the fractionator. This overhead was condensed, separated from water and returned as part of the feed to the oxidizer. The bottoms from the fractionator contained 65% by weight of peroxides and were substantially free from acids.

Example VII

A sample of Diesel engine fuel having a cetane number of 47, a distillation temperature range of about 400° F. to about 700° F. and gravity of about 33.3° A. P. I. was pretreated by percolation through a four foot bed of a granular commercial silical gel adsorbent at ordinary temperatures and the pretreated fuel was found to have a cetane number of 53.6. Samples of the untreated Diesel fuel and of the pretreated fuel were mixed with amounts of the peroxide concentrate obtained in Example VI sufficient to produce fuels containing 1% by weight of peroxides. The untreated fuel containing 1% of peroxide had a cetane number of 54 and the pretreated fuel containing 1% of peroxide had a cetane number of 70.6.

Example VIII

A sample of the raw Diesel fuel having a cetane number of 42.5 was pretreated with sulfuric acid using 20 pounds of 96% sulfuric acid per barrel of fuel. The acid treated material was washed with water, neutralized with dilute sodium hydroxide solution and washed free from alkali with water and the pretreated fuel had a cetane number of 44. To 98.75 parts by weight of untreated Diesel fuel and to a like amount of the fuel pretreated with sulfuric acid was added 1.25 parts by weight of the peroxide concentrate obtained in Example II. This concentrate contained 81% by weight of peroxides so that the resulting Diesel fuels each contained approximately 1% by weight of peroxide. The cetane number of the raw fuel increased from 42.5 to 50 on adding the 1% of peroxides, whereas, the cetane number of the pretreated fuel increased from 44 to 55.5.

Samples of each of the fuels containing 1% by weight of peroxide were placed in storage for a period of four weeks at ordinary atmospheric temperatures. At the end of this storage period the untreated sample was found by analysis to contain about 0.3% by weight of peroxides and had a cetane number of 49. The sample of pretreated Diesel fuel was found to contain 0.75% by weight of peroxides and had a cetane number of 55.

*Example IX*

A sample of the raw Diesel fuel employed in Example VII was pretreated by extraction with two volumes of methanol per volume of the fuel at a temperature of 75° F. This treatment increased the cetane number from 47 to 52.5 and decreased the sulfur content from 0.75% to 0.6%. To the pretreated fuel and to a sample of the raw fuel was added 1% by weight of dimethylcyclopentyl hydroperoxide. The cetane number of the raw fuel containing 1% of this hydroperoxide was 54 and the cetane number of the pretreated fuel containing 1% of the hydroperoxide was 63.0.

To each of these fuels containing peroxide was added 0.01% by weight of alpha naphthol as a gum inhibitor. The addition of inhibitor did not affect the cetane number of either fuel.

*Example X*

A sample of raw Diesel engine fuel having a gravity of 33.3° A. P. I. and a cetane number of 47 was agitated for a period of about two hours at ordinary atmospheric temperature with one-half of its volume of a 5% sodium hypochlorite solution. The treated fuel after washing with water was found to have an A. P. I. gravity of 33.1 and a cetane number of 51. The cetane number of the raw fuel containing 1% dimethylcyclopentyl hydroperoxide was 54, whereas the cetane number of the pretreated fuel containing 1% of the hydroperoxide was 59.5.

*Example XI*

A sample of raw Diesel engine fuel having a cetane number of 47.3, a gravity of 33.2° A. P. I. and containing 0.73% by weight of sulfur was agitated for a period of two hours at ordinary temperatures with 10% by weight of anhydrous aluminum chloride. Approximately 5% by volume of the fuel was lost in this treatment. The pretreated fuel had a cetane number of 49.5, a gravity of 34.4° A. P. I. and contained 0.59% by weight of sulfur. The untreated fuel to which was added 1% by weight of dimethylcyclopentanol hydroperoxide had a cetane number of 54.3 and the pretreated fuel containing 1% of the hydroperoxide had a cetane number of 58.5.

The foregoing description and examples of our invention are not to be taken as limiting since many variations may be made by those skilled in the art without departing from the spirit or the scope of the following claims.

We claim:

1. A Diesel engine fuel consisting essentially of a Diesel engine fuel from which ignition delaying compounds have been removed and between about 0.1% and about 5% by weight of a saturated cyclic hydrocarbon hydroperoxide prepared by oxidizing a saturated cyclic hydrocarbon containing from 4 to 8 carbon atoms in the ring in the liquid phase with a gas containing free oxygen at temperatures of from 150° F. to 325° F. and at a pressure of from normal atmospheric pressure to 500 pounds per square inch gage to maintain said liquid phase, to an acid number not exceeding about 10.7 mg. KOH per ml., to produce an oxidate containing said hydroperoxide in substantial amounts and separating hydroperoxide from the oxidate.

2. A Diesel engine fuel as in claim 1 wherein the oxidation is of a petroleum fraction comprising at least 35% of saturated cyclic hydrocarbons containing from 4 to 8 carbon atoms in the ring, and not more than 10% of aromatics.

3. A Diesel engine fuel as in claim 1 wherein the hydrocarbon is methylhydrohexane.

4. A Diesel engine fuel as in claim 1 wherein the hydroperoxide is a substantially stable water-insoluble saturated cyclic hydrocarbon hydroperoxide having the formula R.OOH, where R is a cyclopentyl group containing at least one methyl and not more than two methyl groups.

5. A Diesel engine fuel as in claim 1 wherein the hydroperoxide is a substantially stable water-insoluble saturated cyclic hydrocarbon hydroperoxide having the formula R.OOH, where R is methylcyclopentyl.

6. A Diesel engine fuel as in claim 1 wherein the hydroperoxide is a substantially stable water-insoluble saturated cyclic hydrocarbon hydroperoxide having the formula R.OOH, where R is dimethyl cyclopentyl.

7. A Diesel engine fuel containing from about 0.1% to about 5% by weight of a saturated cyclic hydrocarbon hydroperoxide prepared by oxidizing a saturated cyclic hydrocarbon containing from 4 to 8 carbon atoms in the ring in the liquid phase with a gas containing free oxygen at temperatures of from 150° F. to 325° F. and at a pressure of from normal atmospheric pressure to 500 pounds per square inch gage to maintain said liquid phase, to an acid number not exceeding about 10.7 mg. KOH per ml., to produce an oxidate containing said hydroperoxide in substantial amounts and separating hydroperoxide from the oxidate.

8. A Diesel engine fuel according to claim 7 in which the oxidation is of a petroleum fraction comprising at least 35% of saturated cyclic hydrocarbons containing from 4 to 8 carbon atoms in the ring, and not more than 10% of aromatics.

9. A Diesel engine fuel according to claim 7 wherein the hydrocarbon oxidized is methylcyclohexane.

10. A Diesel engine fuel containing from about 0.1% to about 5% by weight of a substantially stable water-soluble saturated cyclic hydrocarbon hydroperoxide having the formula R.OOH where R is a cyclopentyl group containing at least one methyl group and not more than two methyl groups, said hydrocarbon peroxide being prepared by oxidizing a saturated cyclic hydrocarbon containing 5 carbon atoms in the ring in the liquid phase with a gas containing free oxygen at temperatures of from 150° F. to 325° F. and at a pressure of from normal atmospheric pressure to 500 pounds per square inch gage to maintain said liquid phase, to an acid number not exceeding about 10.7 mg. KOH per ml., to produce an oxidate containing said hydroperoxide in substantial amounts and separating hydroperoxide from the oxidate.

11. A Diesel engine fuel according to claim 10 in which R is methyl cyclopentyl.

12. A Diesel engine fuel according to claim 10 in which R is dimethyl cyclopentyl.

ADALBERT FARKAS.
ARTHUR F. STRIBLEY, Jr.

REFERENCES CITED

The following references are of record in the file of this patent:

UNITED STATES PATENTS

| Number | Name | Date |
|---|---|---|
| 1,766,501 | Buerk | June 24, 1930 |
| 2,093,008 | Egerton | Sept. 14, 1937 |
| 2,158,050 | Bereslavsky | May 16, 1939 |
| 2,268,022 | Drummond | Dec. 30, 1941 |
| 2,296,558 | Kokatnur | Sept. 22, 1942 |
| 2,298,405 | Milas | Oct. 13, 1942 |
| 2,318,009 | Novak | May 4, 1943 |
| 2,379,228 | Gilbert | June 26, 1945 |

FOREIGN PATENTS

| Number | Country | Date |
|---|---|---|
| 421,928 | Great Britain | Jan. 2, 1935 |